United States Patent
Bocek et al.

(10) Patent No.: US 9,024,623 B2
(45) Date of Patent: *May 5, 2015

(54) TRANSDUCER ASSEMBLY WITH DIGITALLY CREATED SIGNALS

(71) Applicants: Dan Bocek, Santa Barbara, CA (US); Roger Proksch, Santa Barbara, CA (US)

(72) Inventors: Dan Bocek, Santa Barbara, CA (US); Roger Proksch, Santa Barbara, CA (US)

(73) Assignees: Oxford Instruments PLC, Santa Barbara, CA (US); Oxford Instruments AFM, Inc, Santa Barbara, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 13/621,915

(22) Filed: Sep. 18, 2012

(65) Prior Publication Data

US 2013/0024162 A1    Jan. 24, 2013

Related U.S. Application Data

(62) Division of application No. 10/447,297, filed on May 27, 2003, now Pat. No. 8,269,485.

(60) Provisional application No. 60/383,384, filed on May 24, 2002.

(51) Int. Cl.
  *G01B 7/14*  (2006.01)
  *G01D 5/22*  (2006.01)

(52) U.S. Cl.
  CPC .................. *G01D 5/2291* (2013.01)

(58) Field of Classification Search
  CPC ... G01D 5/2291; G01D 5/2066; G01D 3/036; G01D 5/2006; G01D 5/2046; G05B 2219/37133; H03M 2201/514; H03M 2201/84; G06F 1/26; G06F 13/18; G06F 13/37; H02J 5/005; H02J 17/00; H02J 3/36; H02J 7/025
  See application file for complete search history.

(56) References Cited

U.S. PATENT DOCUMENTS

| | | |
|---|---|---|
| 4,222,103 A | 9/1980 | Chamberlin |
| 4,339,714 A | 7/1982 | Ellis |
| 4,646,083 A | 2/1987 | Woods |
| 4,754,220 A | 6/1988 | Shimizu et al. |
| 4,771,630 A | 9/1988 | Croce et al. |
| 4,857,919 A | 8/1989 | Braswell |
| 5,109,675 A | 5/1992 | Hwang |

(Continued)

OTHER PUBLICATIONS

Analog-to-digital converter, http://en.wikipedia.org/wiki/Analogto_to_digital_converter, Wikipedia the free encyclopedia printed May 20, 2006, 8 pages.

*Primary Examiner* — Vinh Nguyen

(74) *Attorney, Agent, or Firm* — Law Office of Scott C. Harris, Inc.

(57) ABSTRACT

Techniques for coupling with devices that convert displacements into differential voltages and improvement of the sensitivity of such devices. A transducer operates based on changes of inductances between primary and secondary of a transformer to produce a differential signal that includes a noninverted signal and an inverted signal. A switch receives the noninverted signal and the inverted signal. A processor creates a square wave signal for driving the transducer input, and also digitally creates an inverted transducer output. A filter operates to filter the square wave output from the processor to produce a substantially single frequency signal at a specified timing having a specified phase relationship relative to the first phase inversion signal based on instructions that are executed by the processor.

27 Claims, 2 Drawing Sheets

(56) References Cited

U.S. PATENT DOCUMENTS

| | | |
|---|---|---|
| 5,172,002 A | 12/1992 | Marshall |
| 5,223,707 A | 6/1993 | Bjork |
| 5,327,030 A | 7/1994 | DeVito et al. |
| 5,412,980 A | 5/1995 | Elings et al. |
| 5,477,473 A | 12/1995 | Mandl et al. |
| 5,606,252 A | 2/1997 | Gschossmann et al. |
| 5,656,769 A | 8/1997 | Nakano et al. |
| 5,714,682 A | 2/1998 | Prater et al. |
| 5,805,448 A | 9/1998 | Lindsay et al. |
| 5,833,634 A | 11/1998 | Laird et al. |
| 6,466,673 B1 | 10/2002 | Hardy |
| 6,530,268 B2 | 3/2003 | Massie |
| 6,707,540 B1 | 3/2004 | Lehman et al. |
| 8,269,485 B2 * | 9/2012 | Bocek et al. ............. 324/207.18 |
| 2002/0175677 A1 | 11/2002 | Proksch et al. |
| 2007/0200559 A1 * | 8/2007 | Proksch et al. .......... 324/207.18 |

* cited by examiner

TRANSDUCER ASSEMBLY WITH DIGITALLY CREATED SIGNALS

CROSS-REFERENCE TO RELATED APPLICATION

This application is a divisional application of U.S. Ser. No. 10/447,297 filed May 27, 2003, which claims priority to U.S. Provisional Application Ser. No. 60/383,384, filed on May 24, 2002, the disclosure of which is herewith incorporated by reference in their entirety.

BACKGROUND

A linear variable differential transformer (LVDT) is a position sensor that can convert mechanical displacements into differential voltages. An LVDT conventionally uses a moving part that is moved within a magnetic field created by another part. An output is produced as the positions of the elements change relative to one another.

One kind of LVDT is described in applicant's co pending application Ser. No. 10/016,475, entitled Improved Linear Variable Differential Transformer For High Position Measurements. However, the present system can be used with any type of transducer which operates differentially, including any LVDT, or any other differential transducer.

The accuracy of the electronics used to process the signal can greatly affect the output value which is received from the LVDT. More precise electronics will improve the resolution and accuracy of the output value.

SUMMARY

The present system teaches a differential transducer, and improved electronics which can be used for excitation and signal conditioning in the differential transducer. In an embodiment, the differential transducer is an LVDT, which is measuring the movement created by an object.

The system described herein may use digital electronics as the excitation and signal conditioning electronics and a transducer of the type disclosed herein.

In a specific embodiment, the transducer is driven by a phase shift circuit which periodically inverts phase, and a switching element, which switches a differential output in synchronism with the changing of the phase. Both the phase shift circuit, and the switching element are formed by a digital processing element, e.g., a processor. In another embodiment, a digital square wave oscillator is formed by a microprocessor which digitally generates primary and reference waveforms for the transducer. This may substantially increase the flexibility and sensitivity of the transducer.

BRIEF DESCRIPTION OF THE DRAWINGS

These and other aspects will now be described in detail with reference to the accompanying drawings, in which.

DETAILED DESCRIPTION

Figure 1:
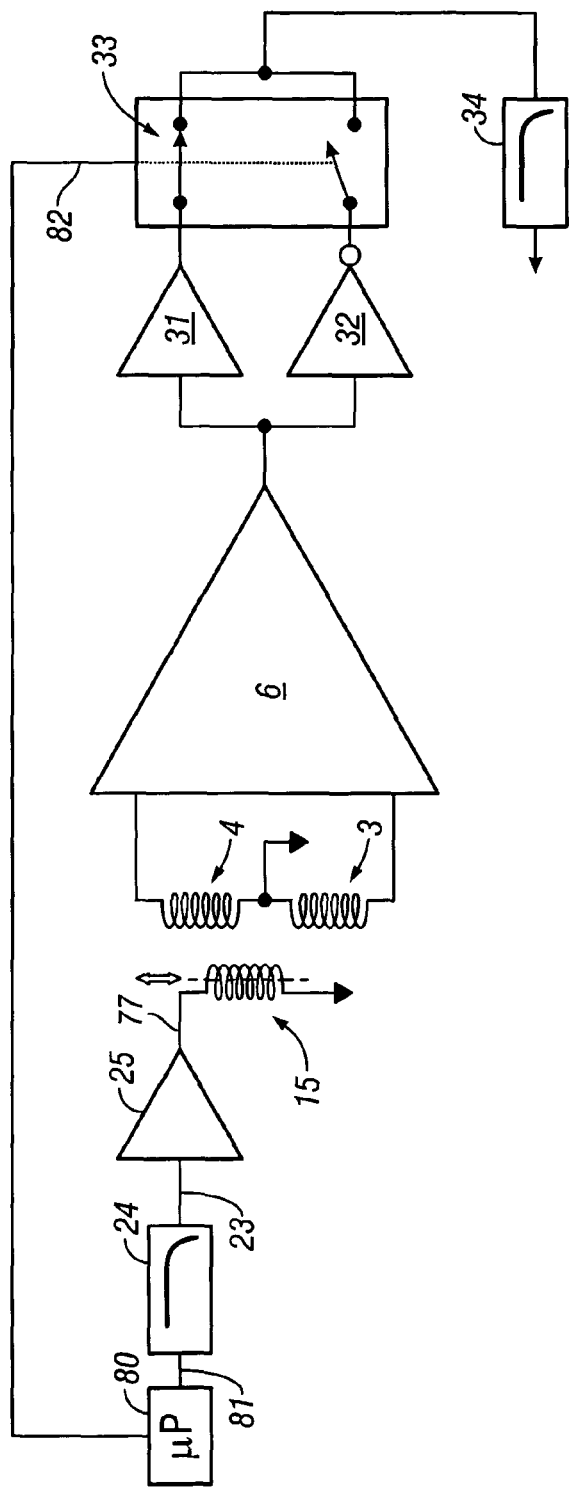
FIG. 1 shows a first embodiment which produces first and second out of phase square waves using a digital processor, which square waves are used for driving excitation and reading of the waveforms.

FIG. 1 shows an embodiment. A differential transducer, here an LVDT, produces an output signal having a magnitude related to an amount of movement in a linear direction. The transducer is formed to exploit changes of inductances between a moving primary and two secondaries, changing as a function of position between these. The output of this device is a signal which is proportional to the position of the moving primary coil 15. This LVDT may be used for converting motion into voltage (or voltage into motion) and as such may be used as a number of different applications. Preferably, however, the transducer is used for high precision applications. For example, this may be used to carry out precision force measurements, for example, in an AFM 100 by measuring the deflection of a flexible cantilever 102 nwith a sharp tip as it pushes or pulls on a surface. The transducer may be used in making force measurements, again, for example, using a cantilever such as a silicon cantilever. The system may also be used for surface profiling, in which case a sharp tip attached to a moving stylus is pivoted around a jewel. Another application may use the system as part of a profilometer, both as a sensor and otherwise. Yet another application may be as part of an atomic force microscope, such as described in applicant's co-pending application or in U.S. Pat. No. RE34,489. The system may also be used as part of a molecular force probe. This system may be ideal for devices that convert very small mechanical displacements, for example as small as subnanometer level (<1 mm), into these differential voltages. While the embodiment describes a linear variable differential transformer or LVDT, this system may also be used with the capacitive-based sensor. In addition to the applications described above, this system may also be used in molecular force measurements, manipulation technology, lithographic manufacturing, nanometer scale surface profiling, and in many different aspects of nanotechnology.

In the embodiment of FIG. 1, a digitally controlled microprocessor 80 produces a square wave output 81 based on stored instructions, which will control the periodic phase inversion in the transducer. The instructions may be stored in a memory, or may be embedded within the processor itself. The square wave output is filtered by filter 24 in order to produce a sine wave 23. The filter 24 may be a low pass filter that effectively removes all harmonics of the square wave above the fundamental. Moreover, the filter is optimized for stability with respect to variations in temperature. Hence, the sine wave which is produced may be substantially pure. The sine wave 23 is amplified and/or buffered by current buffer 25 to produce sine wave 77. The output sine wave 77 is applied to the primary 15 of the transducer.

The sine wave 77 which is applied to the primary may be a substantially perfect frequency and amplitude and virtually noise free. Any defects may be extremely important since any noise or frequency or amplitude instability in the drive can appear in the demodulated output signal. In the embodiment shown in FIG. 1, the primary moves relative to the secondary, however it should be understood that the primary can be stationary with the secondary instead moving.

The movement of the primary induces an induced current into the secondary 3, 4 which is amplified by the differential amplifier 6 and output. The differential amplifier may be a low noise or differential amplifier which is adapted for coupling to a low impedance input source such as a coil.

The output of the differential amplifier is connected to a buffer amplifier 31 and to an inverting buffer amplifier 32. An analog switch 33 selects one of the two outputs respectively from the buffer amplifier 31 or 32. The analog switch is controlled out of phase with the input drive to the primary of the LVDT. In this way, the output signal is selected synchronously with the phase reversal to the primary input.

The output of buffer amplifier 31 which is fed into the normally closed input of an analog switch 33. The output of inverting buffer amplifier 32 is coupled to the normally open input of the switch 33. The analog switch is controlled by an inversion waveform, which may be a square wave which is also produced by the microprocessor 80. This square wave may be shifted by any desired amount relative to the phase reversal square wave 81, by appropriate programming of the microprocessor 80. Moreover, the arrangement of elements 31 and 32 and 33 may be reversed so long as the two parts of this switch are set such that one is open while the other is closed.

Both the square wave driving the primary 15, and also the square wave driving the analog switch 33, are controlled by the processor. In this way, the system uses a single microprocessor to generate an input phase inversion signal for the differential transducer and also to generate an output phase inversion operation for the same differential transducer. The two square waves can be shifted relative to one another. Either the output square wave 82 driving the analog switch can be shifted relative to the primary square wave 81, or vice versa; all that matters is that the relative phase of the primary drive in the reference are adjustable relative to one another.

An important feature of the present system is based on the inventor's recognition that a microprocessor has the capacity to generate a substantially pure and precisely shifted square wave. The square waves may be otherwise identical other than their phase. This may substantially increase the flexibility in sensitivity of electronics as disclosed. Moreover, this may result in a smaller parts count, since the same processor creates two different waveforms.

In one embodiment, the opening and closing of the two parts of switch 33 may occur 90.degree. out of phase relative to the output signal from the amplifier 6.

The output of the analog switch 33 is fed to a stable low noise low pass filter 34 that produces a signal that is proportional to the position of the moving primary coil 15.

Figure 2:
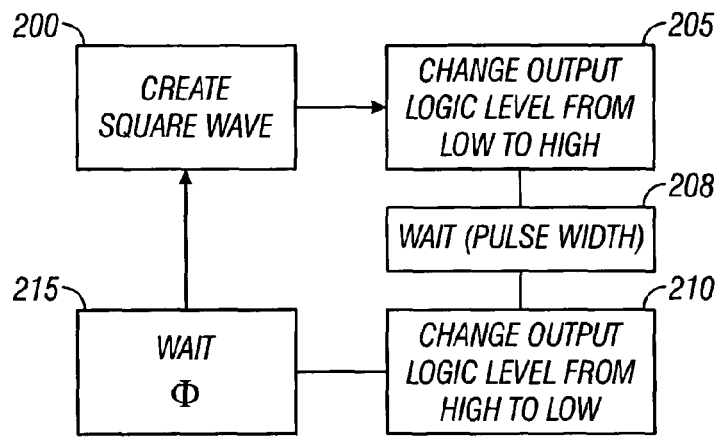
FIG. 2 shows a flowchart of operation of the processor of the first embodiment.

The microprocessor 80 may be any kind of processor including a microcontroller, digital signal processor, reconfigurable logic, or any other type of controllable processing device. The processor 80 may be controlled according to the flowchart of FIG. 2.

At 200, the system operates to create a first square wave. This is done by changing the output logic level from low to high at 205. In this way, the processor produces an output transition forming the first part of the square wave. The processor then waits, during which the duration of the pulse is formed, at 208. The logic level remains high during the waiting. At 210, the end of the square wave is signaled, by changing the output level from high to low. This completes the formation of the first square wave.

A second square wave is created after a phase shift .PHI. The system waits for a time .PHI. at 215, and then proceeds to create another square wave using the same techniques as described above.

Figure 3:
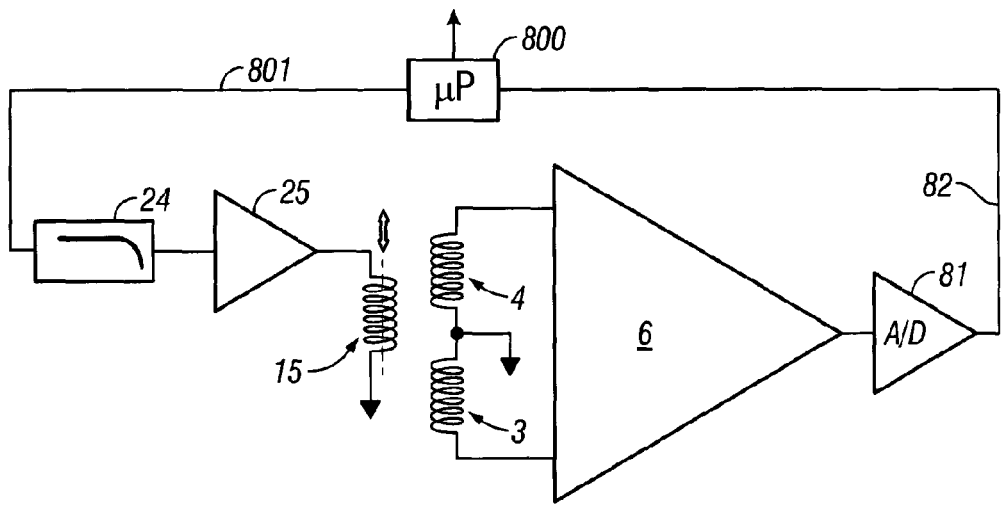
FIG. 3 shows a second embodiment in which a digital processor is used to generate a reference wave and to digitally phase shift the output.

A second embodiment is shown in FIG. 3. This embodiment uses a similar basic layout to the system shown in FIG. 1, however operates using a digital phase shift.

The FIG. 3 embodiment uses the processor 800 to create the digitally created square wave, as in the first embodiment. In addition, however, the output of the differential amplifier is coupled to an A/D converter 81. The digitally-converted signal is fed back to the processor 800. The processor operates to digitally invert the output from the differential amplifier according to a phase-shifted version of the digitally created square wave. That is, in this embodiment, the processor 800 carries out the functionality of the analog switch in the first embodiment. This may even further decrease the part count. Also, as in the first embodiment, the system uses a single microprocessor to generate an input phase inversion signal for the differential transducer and also to generate an output phase inversion operation for the same differential transducer.

Figure 4:
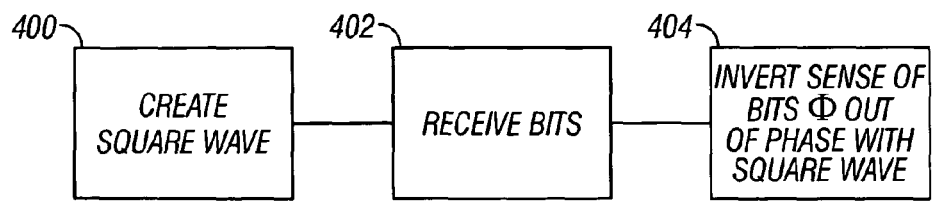
FIG. 4 shows a flowchart of operation of the processor of FIG. 3.

That is, the digital output 82 from the A/D converter is digitally processed by the processor 800. The processor 800 carries out the flowchart shown in FIG. 4.

At 400, the processor creates the square wave 801 which is applied to the low pass filter 24 and used in an analogous way relative to the first embodiment shown in FIG. 1. The processor 800 also receives bits from the A/D converter 81 at 402. The sense of these bits is selectively inverted at 404, in a sense that is .PHI. degrees out of phase with the square wave that was produced at 400. In this way, the bits are inverted in a specified sense relative to the digitally created square wave. By using a controllable processor, further accuracy in the wave may be produced, and additional advantages may be obtained. For example, the processor may be used for other functions in the circuit.

Although only a few embodiments have been disclosed in detail above, other modifications are possible. For example, while the embodiment extensively discloses use with an LVDT, this system may be used in other similar transducers which use periodic phase inversion. Also, other digital processing elements may be used. All such modifications are intended to be encompassed within the following claims, in which:

What is claimed is:

1. A transducer system, comprising:
a transducer assembly, which operates based on changes of inductances between primary and secondary of a transformer to produce a differential signal that includes a noninverted partnoninverted signal and an inverted signal;
a switch, that receives said noninverted signal and said inverted signal; and
a processor, receiving an output of said switch, which produces both a first phase inversion signal for driving an input of said transducer assembly, and which selectively digitally creates an inverted transducer output, where said processor produces a square wave output as said phase inversion signal, and further comprising a filter which filters said square wave output to produce a substantially single frequency signal at a specified timing having a specified phase relationship relative to said first phase inversion signal based on instructions that are executed by the processor.

2. The system as in claim 1, further comprising a current buffer, between said substantially single frequency signal, and said transducer input.

3. The system as in claim 1, wherein said switch is an analog switch, and wherein said analog switch is controlled by a waveform created by said processor.

4. The system as in claim 3, wherein said waveform which controls said analog switch is a square wave having a specified phase relationship with said first phase inversion signal.

5. A system as in claim 4, wherein said specified phase relationship is substantially 90° out of phase.

6. The system as in claim 1, further comprising an A/D converter, coupled to an output of said transducer assembly and creating a digital bitstream indicative of said transducer output.

7. The system as in claim 6, wherein said specified phase relationship is substantially 90° out of phase.

8. A system comprising:
a transducer which operates based on periodic phase inversion;
a programmable processor, which operates according to a stored program, said stored program causing said processor to produce a first waveform based on stored instructions, wherein said first waveform is a square wave produced by a first instruction to produce a rising edge of the square wave, and a second instruction to produce a falling edge of the square wave, and further comprising a low pass filter which filters all but a fundamental frequency of said square wave to produce a substantially pure sine wave that is based on said stored instruction, and using said sine wave to drive said transducer, wherein said processor is also programmable to produce an inversion waveform that selectively inverts an output of the transducer, at a timing having a specified phase relationship with said first waveform.

9. The system as in claim 8, wherein further comprising an analog switch, coupled to receive an output of said transducer, and wherein said programmable processor creates an inversion waveform controls said analog switch.

10. The system as in claim 8, wherein said transducer includes a differential amplifier, further comprising signals defining a first noninverted output of said differential amplifier, and a second inverted output of said differential amplifier, and an analog switch, having two inputs respectively receiving said second inverted output and said first noninverted output, and wherein said inversion waveform controls said analog switch.

11. A transducer system, comprising: a transducer, which operates based on changes of inductances between primary and secondary of a transformer to produce a differential signal that includes a noninverted signal and an inverted signal;
a switch, that receives said noninverted signal and said inverted signal; and a processor, receiving an output of said switch which produces both a first phase inversion signal for driving an input of said transducer, and which produces a second phase inversion signal at a specified timing having a specified phase relationship relative to said first phase inversion signal based on instructions that are executed by the processor, said second phase inversion signal controlling said switch to output either said noninverted signal or said inverted signal.

12. The system as in claim 11, further comprising a current buffer, between said sine wave and said transducer input.

13. The system as in claim 11, wherein said switch is an analog switch, and wherein said processor creates a waveform which controls said analog switch.

14. The system as in claim 13, wherein said waveform which controls said analog switch is a square wave having a specified phase relationship with said first phase inversion signal.

15. The system as in claim 14, further comprising a linear variable differential transformer including said transducer.

16. A system as in claim 14, wherein said specified phase relationship is substantially 90° out of phase.

17. The system as in claim 11, further comprising an A/D converter, coupled to an output of said transducer and creating a digital bitstream indicative of said transducer output, and providing said digital bitstream to said processor, and wherein said processor selectively inverts a sense of said bitstream at said specified phase relationship.

18. system as in claim 17, wherein said specified phase relationship is substantially 90° out of phase.

19. The system as in claim 11, further comprising a linear variable differential transformer including said transducer.

20. An apparatus, comprising:
a digitally controllable processor producing a phase inversion signal for a differential transducer, wherein said digitally controllable processor creates a square wave to execute a first instruction to produce a rising edge, and a second instruction to produce a falling edge, and said digitally controllable processor then low pass filtering all but a fundamental frequency of said square wave to produce a substantially pure sine wave based on said first and second instructions; and
said digitally controllable processor also operable to invert an output of the differential transducer at a timing that is synchronized and has a phase shift relative to said phase inversion signal, by executing instructions which wait a time amount that is based on said phase shift after a first detection made by said digitally controllable processor, to create a signal that inverts said output.

21. The apparatus as in claim 20, wherein said processor receives an output of said transducer as said first detection.

22. The apparatus as in claim 20, wherein said digitally controllable processor inverts said output of the differential transducer by executing instructions to produce an output signal having a specified phase relationship with said phase inversion signal.

23. The apparatus as in claim 20, wherein said digitally controllable processor digitally inverts said output of the differential transducer to create a digitally created inverted signal after a time of said phase shift.

24. The apparatus as in claim 20, further comprising an analog to digital converter, converting the phase inversion signal to form a digital output, and applying the digital output to the digitally controllable processor.

25. The apparatus as in claim 20, wherein said digitally controllable processor inverts the output by creating a specified phase relationship having a specified phase relationship with said phase inversion signal.

26. The apparatus as in claim 20, wherein said differential transducer converts motion into voltage.

27. The apparatus as in claim 26, wherein said motion can be resolved to a resolution of at least 1 nm.

* * * * *